(12) United States Patent
Devarao et al.

(10) Patent No.: US 11,704,141 B2
(45) Date of Patent: Jul. 18, 2023

(54) REAL-TIME CONTEXT PRESERVING VISUAL GUIDANCE

(71) Applicant: International Business Machines Corporation, Armonk, NY (US)

(72) Inventors: Praveen Devarao, Bengaluru (IN); Kush Baronj, Zirapur (IN); Kumar Sudarshan, Bangalore (IN); Arnaj Das, Kolkata (IN); Swati Pandey, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 17/196,812

(22) Filed: Mar. 9, 2021

(65) Prior Publication Data

US 2022/0291935 A1     Sep. 15, 2022

(51) Int. Cl.
*G06F 9/451* (2018.01)
(52) U.S. Cl.
CPC ..................... *G06F 9/453* (2018.02)
(58) Field of Classification Search
CPC ........................................................ G06F 9/453
See application file for complete search history.

(56) References Cited

U.S. PATENT DOCUMENTS

| | | | | |
|---|---|---|---|---|
| 5,239,617 A * | 8/1993 | Gardner | .................. | G06F 9/453 706/45 |
| 5,535,422 A * | 7/1996 | Chiang | .................. | G06F 9/453 715/709 |
| 5,563,805 A * | 10/1996 | Arbuckle | ................ | G06F 9/453 715/708 |
| 5,953,526 A | 9/1999 | Day et al. | | |
| 6,041,182 A | 3/2000 | Hart et al. | | |
| 6,340,977 B1 * | 1/2002 | Lui | ......................... | G06F 9/453 715/709 |

(Continued)

FOREIGN PATENT DOCUMENTS

KR         100543768 B1        1/2006

OTHER PUBLICATIONS

Sato et al., "Automated Help System for Novice Older Users from Touchscreen Gestures," 2016 23rd International Conference on Pattern Recognition (ICPR), Cancun, 2016, pp. 3073-3078, doi: 10.1109/ICPR.2016.7900106.

(Continued)

*Primary Examiner* — Tadesse Hailu
(74) *Attorney, Agent, or Firm* — Yee & Associates, P.C.

(57) ABSTRACT

A method, apparatus, system, and computer program code for real-time visual guidance. A set of actions for a user instance of an application is captured during an operation of the user instance of the application by a user. A visual guidance of a set of steps performed to use a feature in the user instance of the application is generated in response to a user input requesting assistance with the feature. The visual guidance takes into account the set of actions and includes a context of a graphical user interface present for the user instance of the application displayed on a display system when the user input requesting the assistance with the feature is received during the operation of the user instance of the application. The visual guidance of the set of steps performed to use the feature is displayed on the display system.

17 Claims, 8 Drawing Sheets

(56) References Cited

U.S. PATENT DOCUMENTS

| | | |
|---|---|---|
| 7,305,616 B1 | 12/2007 | Nelson et al. |
| 8,930,305 B2 | 1/2015 | Namburu et al. |
| 9,582,132 B1* | 2/2017 | Adelman ................ G06F 3/048 |
| 9,860,139 B2* | 1/2018 | Spracklen ............... H04L 41/40 |
| 11,372,661 B2* | 6/2022 | Namburu .................. G06F 8/38 |
| 11,537,497 B2* | 12/2022 | Balasubramanian ....................... G06F 21/602 |
| 2004/0002959 A1* | 1/2004 | Alpert ................. G06F 16/951 |
| 2004/0135802 A1* | 7/2004 | Allor ....................... G06F 9/453 715/705 |
| 2005/0138559 A1* | 6/2005 | Santos-Gomez ....... G06F 9/453 715/713 |
| 2007/0185721 A1* | 8/2007 | Agassi .................. G06Q 10/10 705/1.1 |
| 2008/0288865 A1 | 11/2008 | Raffel et al. |
| 2009/0158205 A1 | 6/2009 | Hampton et al. |
| 2010/0205529 A1* | 8/2010 | Butin ........................ G06F 8/38 715/704 |
| 2011/0131491 A1* | 6/2011 | Lu ........................... G06F 9/453 715/708 |
| 2011/0314375 A1* | 12/2011 | Zaika ................... G06Q 10/109 715/708 |
| 2013/0013998 A1 | 1/2013 | Eykholt |
| 2016/0253910 A1* | 9/2016 | Fisher ..................... G09B 5/02 434/236 |
| 2016/0259717 A1* | 9/2016 | Nychis ................ G06F 9/45508 |
| 2016/0335643 A1 | 11/2016 | Trunick et al. |
| 2018/0039502 A1 | 2/2018 | Singh |
| 2018/0225130 A1* | 8/2018 | Padmanabhan ....... G06F 3/0481 |
| 2019/0121495 A1 | 4/2019 | Latheef et al. |
| 2020/0043355 A1* | 2/2020 | Kwatra .............. G06Q 10/0633 |
| 2020/0050983 A1* | 2/2020 | Balasubramanian ... G06F 9/451 |
| 2021/0248285 A1* | 8/2021 | Orsos Barrenechea ..................... G02B 27/0103 |
| 2022/0276882 A1* | 9/2022 | Bradfield ............. G06F 9/45512 |

OTHER PUBLICATIONS

"Real-Time Contextual Gesture Guidance," IP.com, 5 pages, https://priorart.ip.com/IPCOM/000202982.

* cited by examiner

REAL-TIME CONTEXT PRESERVING VISUAL GUIDANCE

BACKGROUND

1. Field

The disclosure relates generally to an improved computer system and, more specifically, to a method, apparatus, computer system, and computer program product for providing visual guidance to use features in applications.

2. Description of the Related Art

Documentation for software applications are typically static files. This type of documentation can include a description of steps performed to use a feature. In some cases, screenshots may be included in the documentation. Although this type of documentation can be useful, users can find that locating the desired guidance for a particular feature can be more difficult and time-consuming than desired. Additionally, some users may be less skilled at using software applications than other users and may find this type of documentation difficult to understand and follow. Further, some users may learn through visually seeing the performance of the steps for a feature, which are not provided through static documentation.

SUMMARY

According to one embodiment of the present invention, a method provides real-time visual guidance. A set of actions for a user instance of an application is captured by a computer system during an operation of the user instance of the application by a user. A visual guidance of a set of steps performed to use a feature in the user instance of the application is generated by the computer system in response to a user input requesting assistance with the feature. The visual guidance takes into account the set of actions and includes a context of a graphical user interface present for the user instance of the application displayed on a display system when the user input requesting the assistance with the feature is received during the operation of the user instance of the application. The visual guidance of the set of steps performed to use the feature is displayed by the computer system on the display system.

According to another embodiment of the present invention, a feature guidance system comprises a computer system. The computer system captures a set of actions for a user instance of an application during an operation of the user instance of the application by a user. The computer system generates a visual guidance of a set of steps performed to use a feature in the user instance of the application in response to a user input requesting assistance with the feature. The visual guidance takes into account the set of actions and includes a context of a graphical user interface present for the user instance of the application displayed on a display system when the user input requesting the assistance with the feature is received during the operation of the user instance of the application. The computer system displays the visual guidance of the set of steps performed to use the feature on the display system.

According to yet another embodiment of the present invention, a computer program product for real-time visual guidance comprises a computer-readable storage media with first program code, second program code, and third program code stored on the computer-readable storage media. The first program code is executable by a computer system to capture a set of actions for a user instance of an application during an operation of the user instance of the application by a user. The second program code is executable by the computer system to generate a visual guidance of a set of steps performed to use a feature in the user instance of the application in response to a user input requesting assistance with the feature. The visual guidance takes into account the set of actions and includes a context of a graphical user interface present for the user instance of the application displayed on a display system when the user input requesting the assistance with the feature is received during the operation of the user instance of the application. The third program code is executable by the computer system to display the visual guidance of the set of steps performed to use the feature on a display system.

DETAILED DESCRIPTION

Figure 1:
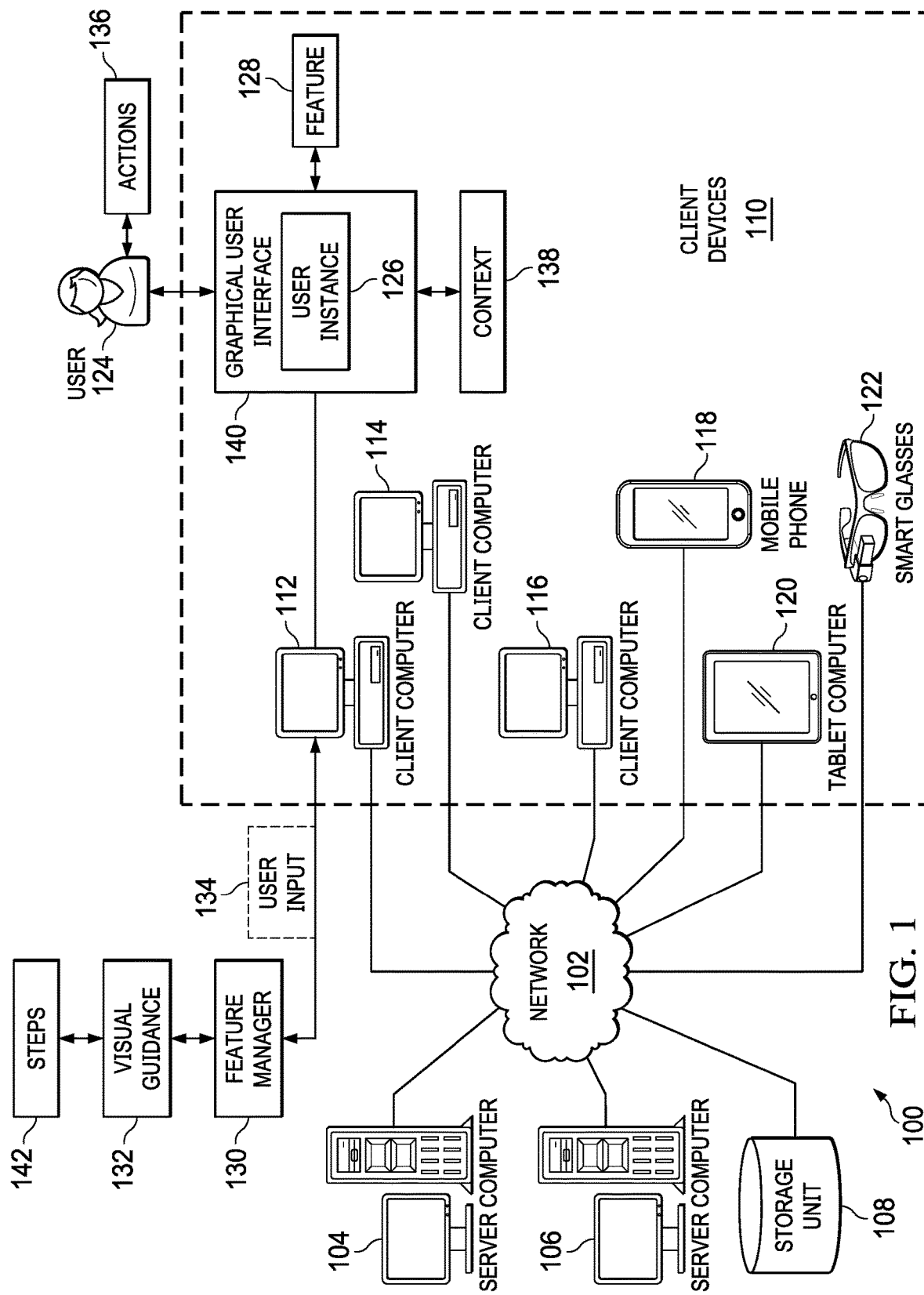
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account one or more different considerations. For example, the illustrative embodiments recognize and take into account that prerecorded videos may be available for learning a feature in an application. The illustrative embodiments recognize and take into account that some users may also need to simultaneously practice steps to learn how to use a feature.

The illustrative embodiments recognize and take into account that even with prerecorded videos, the ability of a user to learn a feature may be more difficult when the context of a graphical user interface is different in a prerecorded video from the context on the graphical user interface for the user needing assistance to use the feature. The illustrative embodiments recognize and take into account in one example that the context of the graphical user interface in a video shows a first window for an application for which the user desires guidance in using a feature. The illustrative embodiments recognize and take into account that this video may not show a second window for another application that overlays the first window application for which the user desires to obtain guidance in using the feature. The second window may hide a graphical control in the first window for the application that is to be manipulated to use the feature. As a result, the user seeing the video may be unable to locate the control on their screen.

The illustrative embodiments recognize and take into account that a current state of a user instance of an application is not taken into account with currently available documentation. For example, the illustrative embodiments recognize and take into account that a user may have an image that the user wishes to edit using a feature such as photo editing tool in the user instance. The illustrative embodiments recognize and take into account that the user may desire to perform a number of actions on the image using the photo editing tool. The illustrative embodiments recognize and take into account that currently available documentation shows editing a predefined image rather than the image present in the user instance when the user desires guidance to use the photo editing tool. In this example, the current image present in the user instance is part of the current state of the user instance of the application. The illustrative embodiments recognize and take into account that current documentation may not be intuitive to some users because the current state of the user instance is not taken into account in the documentation.

Thus, the illustrative embodiments recognize and take into account that it would be desirable to have a method, apparatus, computer system, and computer program product that takes into account the issues discussed above as well as other possible issues. For example, it would be desirable to have a method, apparatus, computer system, and computer program product that generate visual guidance that is based on a current context of a graphical user interface for a user requesting guidance to use a feature for an application.

In the illustrative example, this generation of visual guidance can be performed in real-time. If the visual guidance is created while a user uses an application, the visual guidance can take into account the current state of the application for which guidance is requested for a feature in the application. In other words, the illustrative example can identify the current state of the application and provide guidance from that current state to use the feature for which the user has requested guidance. As a result, the visual guidance can take into account both the current context of the graphical user interface and the current state of the user instance of the application.

In one illustrative example, a computer system captures a set of actions for a user instance of an application during an operation of the user instance of the application by a user. The computer system generates a visual guidance of a set of steps performed to use a feature in the user instance of the application in response to a user input requesting assistance with the feature. The visual guidance takes into account a set of actions and includes a context of a graphical user interface present for the user instance of the application displayed on a display system when the user input requesting the assistance with the feature is received during the operation of the user instance of the application. The computer system displays the visual guidance of the set of steps performed to use the feature on the display system. As a result, the visual guidance can be formed in a real-time manner taking into account the current context of the graphical user interface at the time the user requests the visual guidance for a feature in a user instance of an application.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, user 124 operates client computer 112. As depicted, user instance 126 of an application runs on client computer 114. User 124 can request guidance in using feature 128 in user instance 126 of the application. In the illustrative example, feature manager 130 can generate visual guidance 132 for using feature 128 in response to receiving user input 134 from user 124 requesting assistance or help with feature 128.

In this illustrative example, feature manager 130 can run on client computer 114 and can take the form of a system instance of the application. In another illustrative example, feature manager 130 can be run in a remote location such as on server computer 104. In yet other illustrative examples, feature manager 130 can be distributed in multiple locations within network data processing system 100. For example, feature manager 130 can run on client computer 112 and on client computer 114 or on client computer 112 and server computer 104 depending on the particular implementation.

Feature manager 130 can operate to capture a set of actions 136 performed by user 124. The set of actions 136 can be one or more actions performed by user 124 on user instance 126 of the application. Additionally, feature manager 130 can identify context 138 of graphical user interface (GUI) 140. In this example, this context is context 138 for graphical user interface 140 present at the time that user 124 requests guidance for using feature 128 in user instance 126.

In this illustrative example, feature manager 130 generates visual guidance 132 of a set of steps 142 that is performed to use feature 128 in user instance 126. In this illustrative example, feature manager 130 generates visual guidance 132 using the set of actions 136 and context 138. The set of actions 136 can be used to identify a current state of user instance 126 and the current state can be used to identify what steps need to be performed to use feature 128.

In this illustrative example, feature manager 130 can replicate context 138 in visual guidance 132 such that user 124 is provided a visualization of steps in the same context as context 138 for graphical user interface 140 as displayed on the display system in client computer 114.

Further, visual guidance 132 generated by feature manager 130 can also include steps that may be performed with respect to other elements in graphical user interface 140 that may need to be manipulated to use feature 128 when context 138 is taken into account. For example, a window or another application may need to be moved, resized, minimized, or closed to view or access a graphical control in user instance 126 for using feature 128. Visual guidance 132 can include this step to provide user 124 a clear visualization of how to use feature 128. By taking into account context 138, visual guidance 132 can provide more familiarity and easier understanding to user 124 in using feature 128 in user instance 126 of the application.

Figure 2:
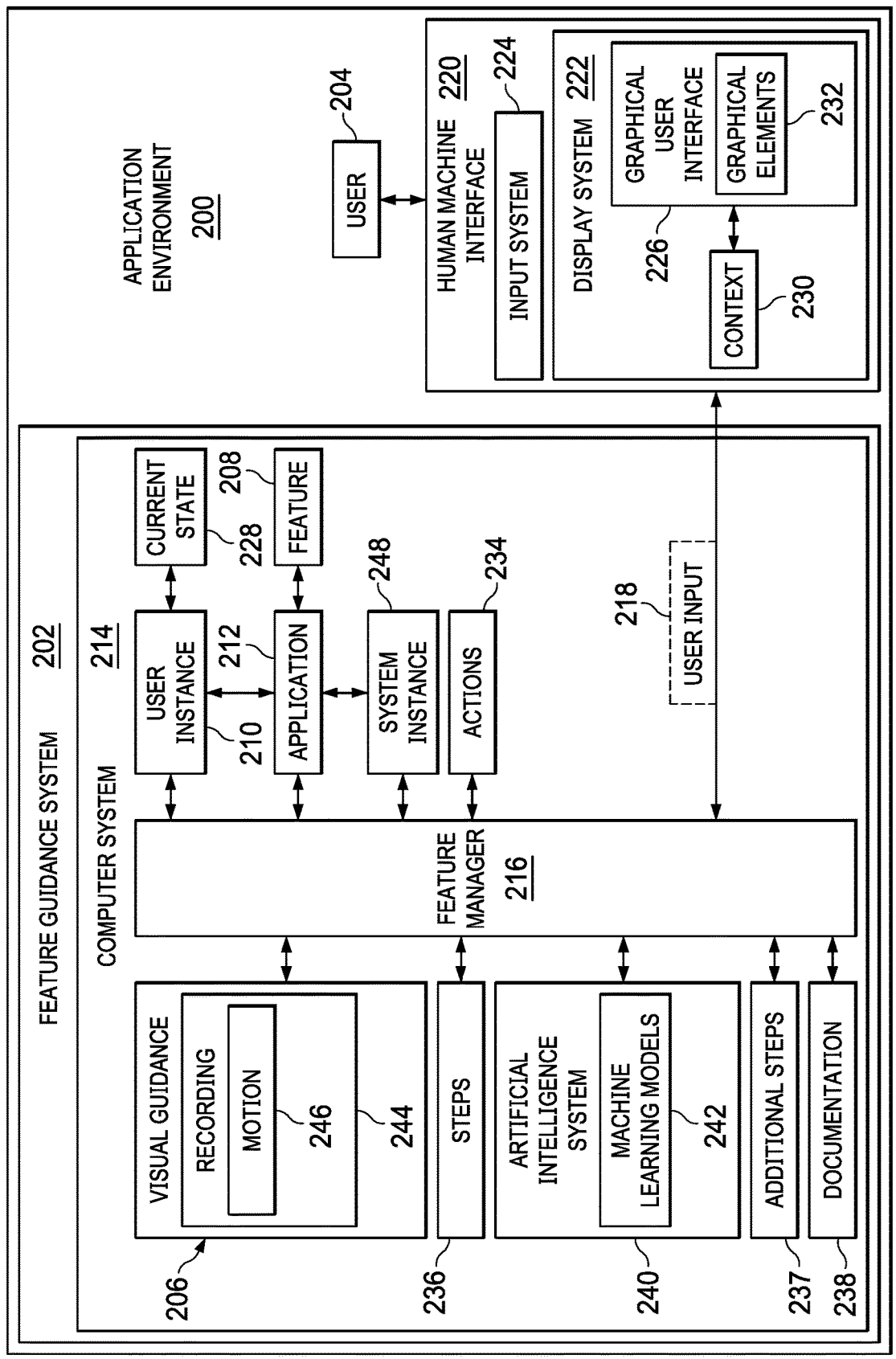
FIG. 2 is a block diagram of an application environment in accordance with an illustrative embodiment.

With reference now to FIG. 2, a block diagram of an application environment is depicted in accordance with an illustrative embodiment. In this illustrative example, application environment 200 includes components that can be implemented in hardware such as the hardware shown in network data processing system 100 in FIG. 1.

In this illustrative example, feature guidance system 202 in application environment 200 can provide visual guidance 206 to user 204 on how to use feature 208 in user instance 210 of application 212. In this depicted example, user instance 210 is a copy of application 212 used by user 204 in this illustrative example. Multiple instances of application 212 can be by user 204 or other users.

As depicted, feature guidance system 202 comprises computer system 214 and feature manager 216. Feature manager 216 runs in computer system 214. Feature manager 216 can be implemented in software, hardware, firmware, or a combination thereof. When software is used, the operations performed by feature manager 216 can be implemented in program code configured to run on hardware, such as a processor unit. When firmware is used, the operations performed by feature manager 216 can be implemented in program code and data and stored in persistent memory to run on a processor unit. When hardware is employed, the hardware may include circuits that operate to perform the operations in feature manager 216.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 214 is a physical hardware system and includes one or more data processing systems. When more than one data processing system is present in computer system 214, those data processing systems are in communication with each other using a communications medium. The communications medium can be a network. The data processing systems can be selected from at least one of a computer, a server computer, a tablet computer, or some other suitable data processing system.

In this illustrative example, feature manager 216 can generate visual guidance 206 in real-time. In other words, visual guidance 206 can be generated in response to receiving user input 218 from user 204 using human machine interface (HMI) 220 without any intentional delay.

As depicted, human machine interface 220 comprises display system 222 and input system 224. Display system 222 is a physical hardware system and includes one or more display devices on which graphical user interface 226 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 204 is a person that can interact with graphical user interface 226 through user input 218 generated by input system 224 for computer system 214. Input system 224 is a physical hardware system and can be selected from at least one of a mouse, a keyboard, a trackball, a touchscreen, a stylus, a motion sensing input device, a gesture detection device, a cyber glove, or some other suitable type of input device.

In this illustrative example, human machine interface 220 can enable user 204 to interact with one or more computers or other types of computing devices in computer system 214. For example, these computing devices can be client devices such as client devices 110 in FIG. 1.

In this illustrative example, feature manager 216 in computer system 214 is configured to dynamically generate visual guidance 206 using current state 228 and context 230 of graphical user interface 226 that are present at the time the request is made in user input 218 for assistance with feature 208. In other words, visual guidance 206 is not prerecorded or generated ahead of time as with current documentation for applications. Instead, visual guidance 206 can be generated dynamically when user input 218 is received requesting assistance with user instance 210 of application 212. Further, visual guidance 206 can be generated in real-time. For example, with real-time generation, visual guidance 206 can be generated when user input 218 is received without any intentional delay.

In this depicted example, current state 228 is the state of user instance 210 of application 212. Context 230 is a context for graphical user interface 226 in which user instance 210 of application 212 is displayed. Context 230 can include at least one of screen space available for user instance 210, a resolution for user instance 210, a foreground location of a set of other applications overlaying user instance 210, a background location of a number of applications overlayed by user instance 210, a number of nonactive tabs visible in an application such as a browser, or a "look and feel" of graphical user interface 226 on which user instance 210 is located. In this illustrative example, the reference to user instance 210 in context 230 refers to a window or graphical elements used to display user instance 210 in graphical user interface 226 to user 204.

In this illustrative example, the "look and feel" of graphical user interface 226 comprises the aspects of the design and configuration of graphical user interface 226. This "look and feel" can include elements such as, for example, colors, shapes, layout, typefaces, line thickness, line types, and other elements that contribute to the "look" for graphical user interface 226. The behavior dynamic elements such as buttons, boxes, menus, and other graphical controls contribute to the "feel" of graphical user interface 226. For example, the "look and feel" can include the design of a browser in which user instance 210 can run. This browser can include tabs in which one is in focus while other nonactive tabs in the background provide for a particular "look and feel" in graphical user interface 226.

As depicted, current state 228 of user instance 210 can be the data particular to user instance 210 at a particular point in time. Current state 228 can comprise all of the information needed to run user instance 210. For example, current state 228 can be the content of memory for user instance 210. Current state 228 of user instance 210 can include, for example, global variables, static variables, objects allocated for user instance 210, open file descriptors, file offsets, open network sockets, window display information, and other information. In some illustrative examples, current state 228 can comprise information needed to determine a set of steps 236 for feature 208 and may not necessarily include all information about user instance 210.

In this illustrative example, context 230 can include the information about graphical elements 232 in graphical user interface 226. In this example, context 230 is the current context present for graphical user interface 226 when user 204 requests assistance for help with using feature 208. For example, context 230 can include information about the display of windows, graphical controls, images, and other graphical elements in graphical user interface 226. In this example, context 230 is the current context present for graphical user interface 226 when user 204 requests assistance for help with using feature 208.

The information in context 230 can include an identification of which windows are in the foreground and which windows are in the background. Context 230 can also include an identification of windows overlapping the window for user instance 210 and windows overlapped by the window for user instance 210. Further, context 230 can include the size and position of the windows within graphical user interface 226. Context 230 can also include the resolution of graphical user interface 226.

In this illustrative example, feature manager 216 is configured to perform a number of different operations to generate visual guidance 206. Feature manager 216 can capture a set of actions 234 for user instance 210 of application 212 during operation of user instance 210 of application 212 by user 204. In this illustrative example, actions 234 can be captured for user 204. Actions 234 can be captured in user input 218 generated by user 204 interacting with human machine interface 220.

Further, feature manager 216 can generate visual guidance 206 of the set of steps 236 performed to use feature 208 in user instance 210 of application 212 in response to user input 218 requesting assistance with feature 208. In this particular example, visual guidance 206 takes into account the set of actions 234 and includes context 230 of graphical user interface 226 present for user instance 210 of application 212 displayed on display system 222 when user input 218 requesting the assistance with feature 208 is received during the operation of user instance 210 of application 212.

In this illustrative example, actions 234 in user input 218 can be captured in a number of different ways. For example, system instance 248 of application 212 can be run by feature manager 216. System instance 248 can be a full copy of application 212 in which all user input made user instance 210 are also made to system instance 248.

User input 218 can be captured and sent to system instance 248 using mechanisms such as hooks. A hook is program code that can operate to intercept function calls, messages, events, or other information passed between software components including user input 218.

By applying the same user input to both user instance 210 and system instance 248 of application 212, feature manager 216 can identify current state 228 of user instance 210 through the state of system instance 248. In other words, the set of actions 234 embodied in user input 218 for user 204 can be replicated in system instance 248 of application 212.

When system instance 248 is used, system instance 248 can be launched at the same time as user instance 210. In this manner, all of actions 234 performed by user 204 on user instance 210 of application 212 can be replicated in system instance 248 of application 212.

Additionally, the set of actions 234 can include actions in addition to user actions performed by user 204. For example, the set of actions 234 can also include output generated by user instance 210. In other words, a hook or a set of hooks can be used to intercept input and output from user instance 210. This user input and output from user instance 210 can be used to determine current state 228 of user instance 210. For example, this information can be input into artificial intelligence system 240 to determine current state 228 of user instance 210 and the set of steps 236 from current state 228. With this implementation, artificial intelligence system 240 can be trained to determine current state 228 and a set of steps 236 from training data derived from various inputs and outputs to different instances of application 212. In this illustrative example, the set of steps 236 are steps that user 204 can perform to use feature 208.

In other illustrative examples, system instance 248 may not be a full working copy or instance of application 212. Instead, system instance 248 includes processes to track actions 234 in a sequence performed by user 204 on user instance 210 of application 212 using user input 218 that embodies the set of actions 234.

In this case, the set of actions 234 performed by user 204 can later be replayed using system instance 248 instead of having system instance 248 running concurrently or at the same time as user instance 210. In other words, system instance 248 can run when assistance is requested by user 204 for feature 208. At other times, system instance 248 records the set of actions 234 without running other operations or calculations performed by user instance 210. With this example, processing resource usage can be reduced during operation of user instance 210 by user 204, which may enable increased performance of user instance 210 and other applications.

For example, in generating visual guidance 206, feature manager 216 can identifying the set of steps 236 performed to use feature 208 from the set of actions 234. Feature manager 216 can identify the set of steps 236 from current state 228 of user instance 210 using the set of actions 234 performed by user 204 with respect to user instance 210 of application 212. Different states identified for current state 228 can result in different steps being performed to use feature 208. With current state 228, feature manager 216 can identify which ones of steps 236 need to be performed to use feature 208 from current state 228.

For example, if user 204 desires to use a save feature in a word processor application and current state 228 of user instance 210 of the word processor application in the document has no restrictions, the set of steps 236 can be to select a disk icon in the tool bar. On the other hand, if the document is in a read-only state, then the set of steps 236 can be to (1) select the disk icon in the tool bar, (2) select a location, (3) enter a file name to save the document that is in the read-only state, and (4) select the save button after naming the document.

In one illustrative example, feature manager 216 can identify the set of steps 236 using documentation 238 for application 212. Documentation 238 can include at least one of a file, instructions, diagrams, or other information that describes the use of feature 208.

Further, documentation 238 can be in a computer-readable form. For example, documentation 238 can include a set of steps 236 in computer-readable form for different features such as feature 208. Feature manager 216 can perform the set of steps 236 using documentation 238 taking into account current state 228 of user instance 210 and context 230 of graphical user interface 226 to generate visual guidance 206.

In some illustrative examples, feature manager 216 can use artificial intelligence system 240. Artificial intelligence system 240 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

In this illustrative example, artificial intelligence system 240 can include a set of machine learning models 242. A machine learning model is a type of artificial intelligence model that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, and anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

In generating visual guidance 206, feature manager 216 can create recording 244 that has motion 246 showing the execution of the set of steps 236 performed to use feature 208. Further, the set of steps 236 in recording 244 can be performed in context 230 of graphical user interface 226 present in user instance 210 of application 212 when user input 218 requesting the assistance with feature 208 is received during the operation of user instance 210 of application 212. In this manner, visual guidance 206 can be dynamically generated and can be generated in real-time.

In one illustrative example, recording 244 can be generated by performing the set of steps 236 on system instance 248 starting at current state 228 when user 204 requests assistance with feature 208. As these steps are performed on system instance 248, recording 244 can be generated based on the output or results of the set of steps 236 being performed on system instance 248. Thereafter, the state of system instance 248 can be rolled back to current state 228 for user instance 210 for use in further tracking of additional actions by user 204.

In this illustrative example, feature manager 216 can also take into account context 230 in identifying the set of steps 236. For example, a group of additional steps 237 can be added to the set of steps 236 for using feature 208. The group of additional steps 237 may not be steps with respect to user instance 210 but can be one or more steps performed to enable or make using feature 208 easier for user 204. As used herein, a "group of," when used with reference to items, means one more items. For example, a "group of additional steps" is one or more additional steps.

For example, one or more of additional steps 237 can be added to the set of steps 236 that can move graphical elements 232 that are not part of user instance 210. For example, the group of additional steps 237 may move graphical elements 232 such as windows that may cover graphical elements 232 in user instance 210 in which these graphical elements are manipulated in the set of steps 236. For example, an additional step can be added to the set of steps 236 to move, close, or minimize a window that is not part of user instance 210 that hides a graphical element such as a graphical control that is manipulated in the set of steps 236 to use feature 208.

Further, feature manager 216 can display visual guidance 206 of the set of steps 236 performed to use feature 208 in graphical user interface 226 on display system 222. As depicted, visual guidance 206 includes motion 246 in recording 244 demonstrating the set of steps 236 for using feature 208. In this illustrative example, visual guidance 206 can include at least one of a video or an animated graphical interchange format (GIF). Additionally, visual guidance 206 can also include other multimedia aspects such as at least one of an audio instruction, captions, a graphical indicator, or other graphical elements to visually demonstrate the performance of the set of steps 236 needed for using feature 208.

In one illustrative example, one or more solutions are present that overcome a problem with providing assistance to use features in applications. As a result, one or more illustrative examples may provide assistance in the form of visual guidance. This visual guidance is dynamically generated in a manner that provides the visual guidance in a context of a current usage of a user instance of an application by a user. For example, users less skilled at using software-based applications, such as young people and people with little or no exposure to particular applications, can benefit from viewing visual guidance 206.

Further, the visual guidance provided in the illustrative examples can provide improved guidance to users who may learn by visually seeing the performance of steps for a feature from the current state of the user instance of the application. Visual guidance can be provided using the current context of the graphical user interface to avoid a user having to adapt or understand how the steps can be performed with respect to the current context of the graphical user interface. In other words, the visual guidance can include the same windows, colors, resolution, and other graphical features in graphical user interface 226 that is currently present for user 204 using user instance 210 of application 212.

Computer system 214 can be configured to perform at least one of the steps, operations, or actions described in the different illustrative examples using software, hardware, firmware, or a combination thereof. As a result, computer system 214 operates as a special purpose computer system in feature manager 216 in computer system 214. In particular, feature manager 216 transforms computer system 214 into a special purpose computer system as compared to currently available general computer systems that do not have feature manager 216. In this example, computer system 214 operates as a tool that can increase at least one of speed, accuracy, or usability of computer system 214. In particular, this increase in performance of computer system 214 can be for the use of user instance 210 of application 212 by user 204. In one illustrative example, visual guidance 206 provides for increased comprehension and speed at which features, such as feature 208, can be learned by user 204 as compared with using current documentation systems.

In this illustrative example, the increased performance can be realized through feature manager 216 providing visual guidance 206 in which visual guidance 206 includes a set of steps 236 identified based on current state 228 of user instance 210 and context 230 in graphical user interface 226. With visual guidance 206, additional steps 237 can be present in the set of steps 236 that can take into account manipulations that may be needed to be made to graphical elements 232 in graphical user interface 226 in addition to manipulation of user instance 210 to use feature 208.

The illustration of application environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, feature manager 216 can be employed to provide guidance for one or more features in addition to or in place of feature 208 for application 212. Further, feature manager 216 can be employed to generate visual guidance 206 for multiple instances of application 212 that may be concurrently operated by user 204 or other users.

Figure 3:
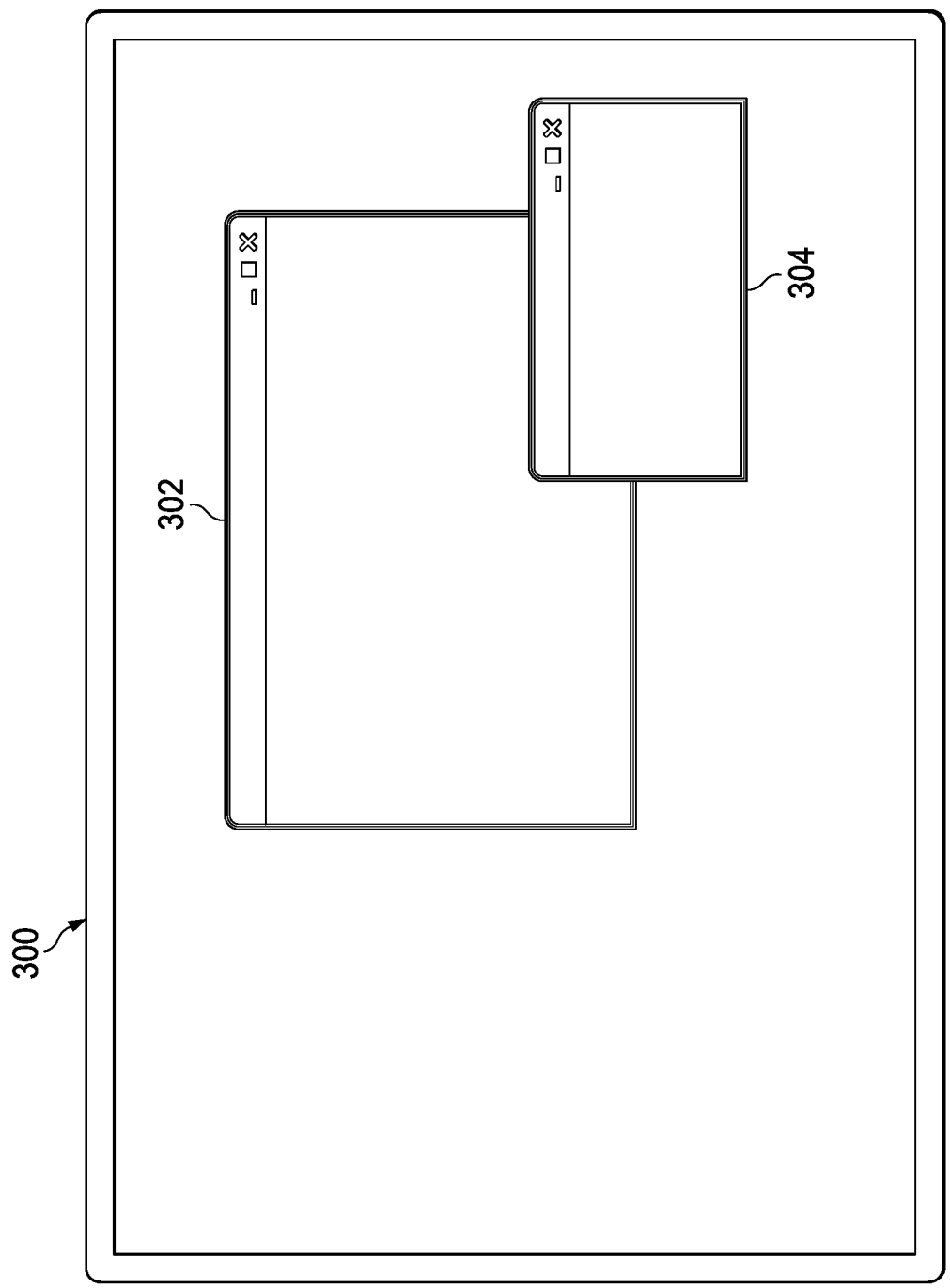
FIG. 3 is a graphical user interface in which a visual guidance can be presented in accordance with an illustrative embodiment.
Figure 4:
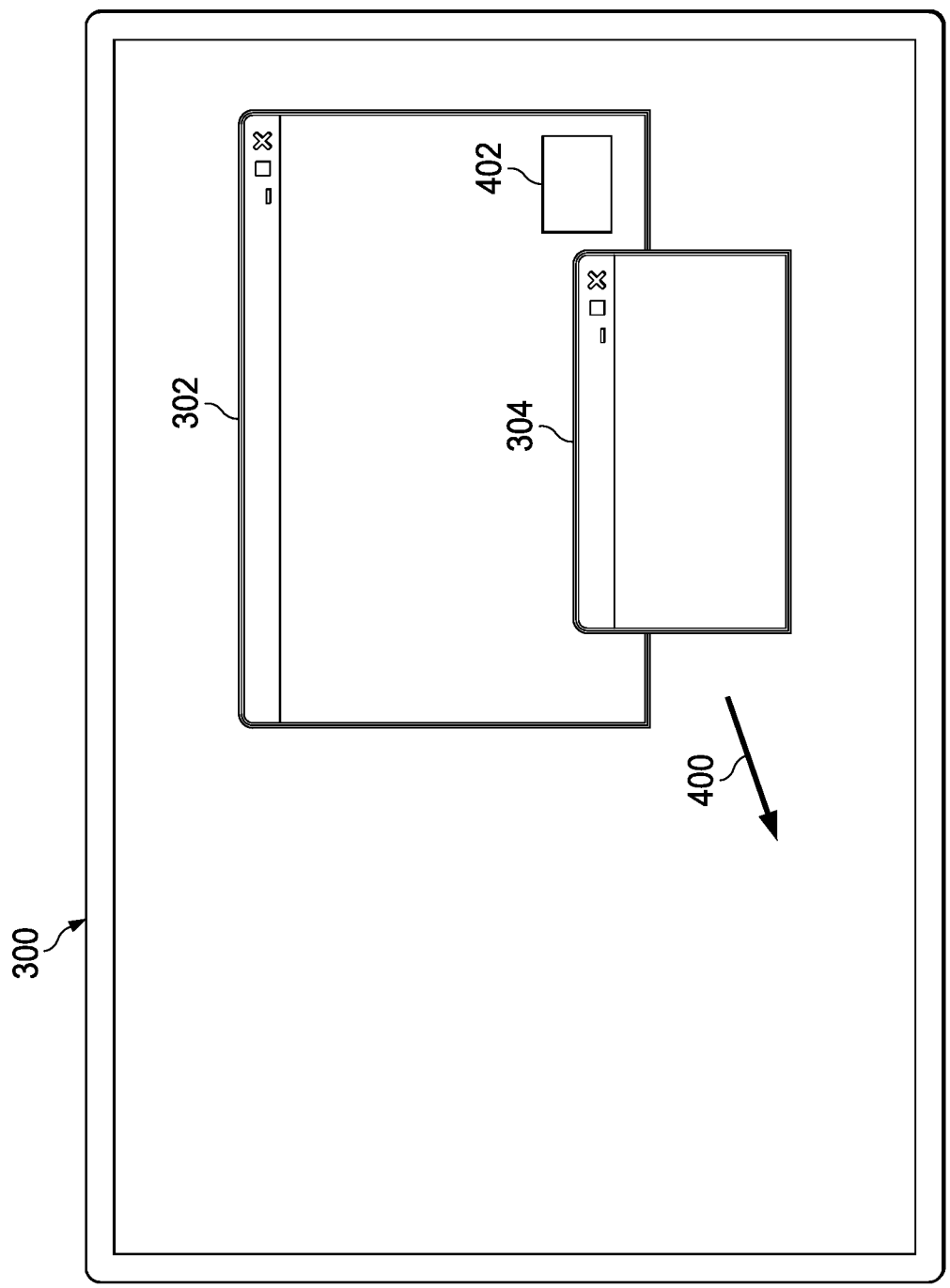
FIG. 4 is an illustration of a visual guidance in which motion is present that moves a window to reveal a location of a graphical control in accordance with an illustrative embodiment.
Figure 5:
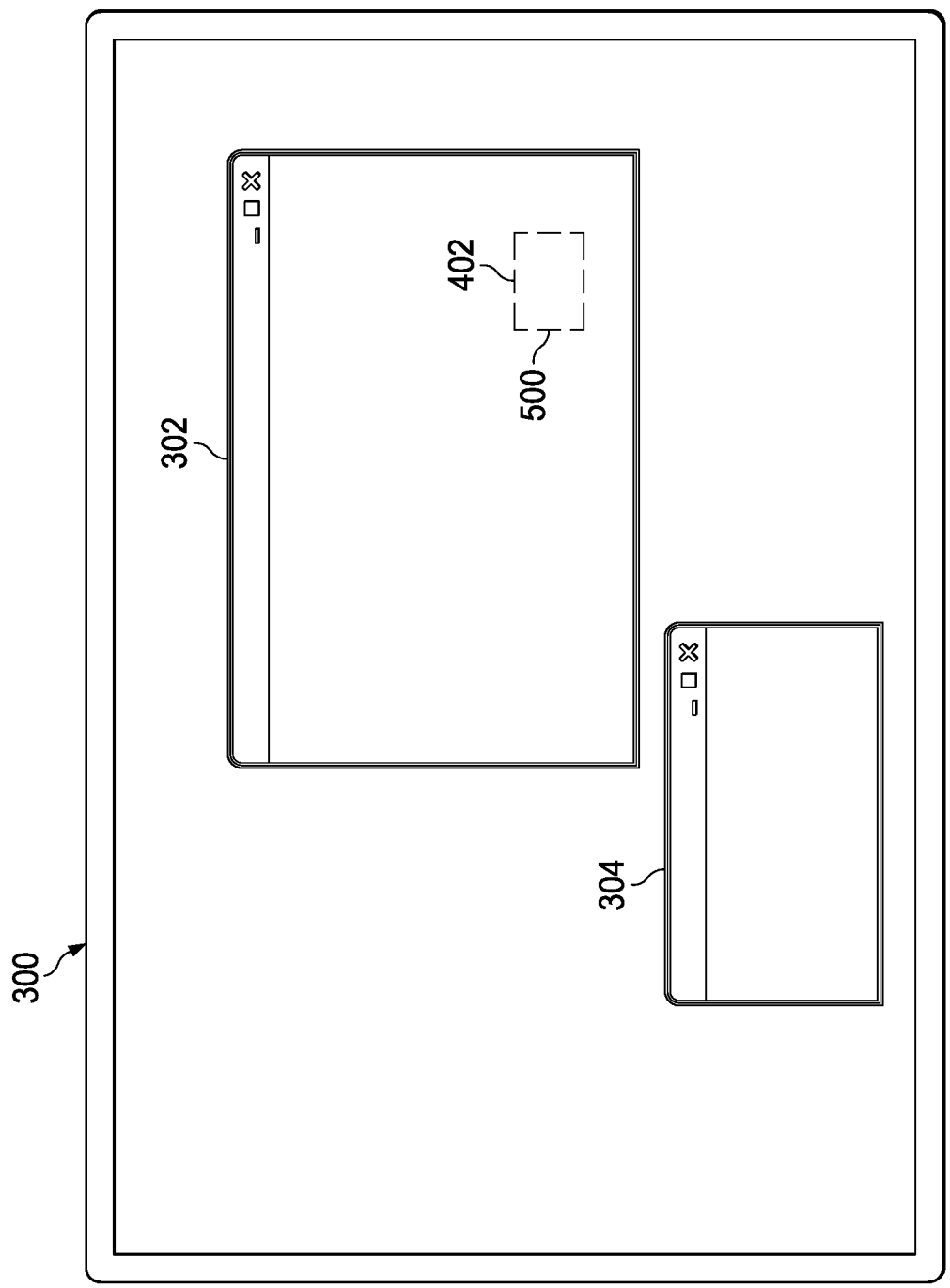
FIG. 5 is an illustration of a visual guidance in which motion is present that selects a graphical control after movement of a window in accordance with an illustrative embodiment.

Turning now to FIGS. 3-5, illustrations of a visual guidance or a feature is depicted in accordance with an illustrative embodiment. With reference to FIG. 3, a graphical user interface is depicted in which a visual guidance can be presented is depicted in accordance with an illustrative embodiment. As depicted, graphical user interface 300 is an example one implementation for graphical user interface 140 in FIG. 1 and graphical user interface 226 in FIG. 2. In this illustrative example, a user instance is displayed within user instance window 302. Additionally, window 304 is shown overlapping user instance window 302.

In this example, the context for graphical user interface 300 comprises user instance window 302 and window 304. The context also includes the positioning of these windows as well as the sizing of these windows. Context can also include color, resolution, and other information about graphical user interface 300 that can contribute to the "look and feel" for graphical user interface 300.

In this instance, a user has requested assistance for a feature for a user instance of an application. In this case, the steps identified include selecting a graphical control in user instance window 302 that is hidden or obscured by window 304. In this example, the visual guidance takes into account the context of graphical user interface 300 and takes into account that the send button may be hidden from view. As a result, in demonstrating steps to use the send a feature, a visual guidance can include an additional step of moving window 304.

With reference next to FIG. 4, an illustration of a visual guidance in which motion is present that moves a window to reveal a location of a graphical control is depicted in accordance with an illustrative embodiment. In this illustrative example, the visual guidance includes motion that shows the movement of window 304 in the direction of arrow 400. This movement of window 304 in the visual guidance reveals graphical control 402.

Turning now to FIG. 5, an illustration of a visual guidance in which motion is present that selects a graphical control after movement of a window is depicted in accordance with an illustrative embodiment. As depicted, the visual guidance shows completion of the movement of window 304 and a selection of graphical control 402 to use the feature. The selection is indicated by graphical indicator 500. In this manner, the visual guidance, including the context of the graphical user interface present when the user requests assistance with a feature, can increase the ease at which the user can understand how to use the feature.

For example, window 304 can be a window for a navigation application. User instance window 302 can be a window for a user instance of a messaging application. In this example, the user may request assistance in using a feature to send a message. Normal documentation can refer the user to use a send button. In this case, this send button is represented by graphical control 402 and is not visible to the user in FIG. 3 when the user needs assistance with the send feature. The visual guidance in the illustrative example includes an additional step for guiding the user to move window 304 out of the way of the send button. In this manner, a user may more easily and intuitively understand how to use the send feature when the visual guidance is generated such that the context of the graphical user interface and the state of the instance of the application are taken into account.

Further, the visual guidance illustrated in FIGS. 3-5 can be displayed in a number of different ways. For example, the visual guidance can be displayed using a split screen in which a first part of the split screen displays the user instance and a second part of the split screen displays the visual guidance. In this manner, the user can see the visual guidance perform the steps for the feature and still see the current context of the graphical user interface for reference. When the visual guidance is displayed a split screen, the split does not have to be an equal split. For example, the visual guidance displayed in the second part can be larger or smaller as compared to the first part displaying the user instance.

In another example, the visual guidance can be displayed in graphical user interface 300 in place of the current display of the user instance. After the visual guidance is completed, graphical user interface 300 can return the display of the current context of the user instance such that the user can then perform the steps needed for using the feature.

The illustrations of graphical user interface in FIGS. 3-5 are provided as one illustrative example of an implementation for generating and presenting a visual guidance and are not meant to limit the manner in which the visual guidance can be generated and presented in other illustrative examples. In one example, window 304 can be minimized, resized, or closed instead of being moved in graphical user interface 300. In yet another example, user instance window 302 can be moved or resized to enable viewing of graphical control 402.

In another illustrative example, the visual guidance can be used to provide assistance in editing an image using a feature such as an editing tool. In this illustrative example, the visual guidance can take into account the context of a graphical user interface which includes a particular image present in the user instance. As a result, the visual guidance can include steps that show how to crop the image displayed in the window. This context in which the actual image is present in the visual guidance can increase the means or ability of a user to understand how to use a feature such as an editing tool. Further, other illustrative examples can include many additional steps in addition to the window movement and graphical control selection depicted in FIGS. 3-5. In other illustrative examples, the steps can include a sequence of steps that includes selecting a menu, selecting a menu entry, entering a value, and other suitable steps to use a feature.

Figure 6:
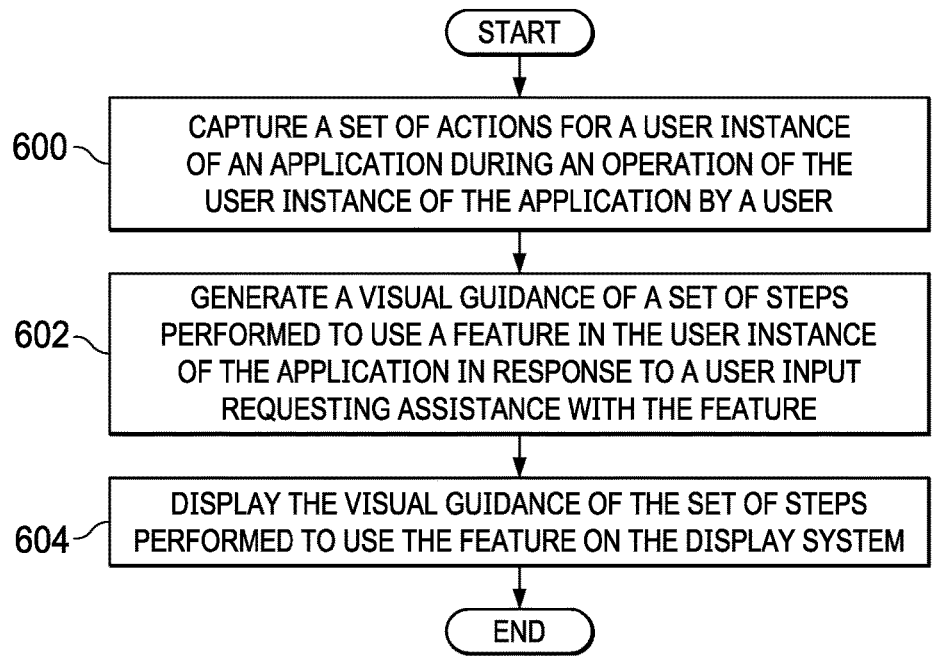
FIG. 6 is a flowchart of a process for real-time visual guidance in accordance with an illustrative embodiment.

Turning next to FIG. 6, a flowchart of a process for real-time visual guidance is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in feature manager 216 in computer system 214 in FIG. 2.

The process begins by capturing a set of actions for a user instance of an application during an operation of the user instance of the application by a user (step 600). The process generates a visual guidance of a set of steps performed to use on a feature in the user instance of the application in response to a user input requesting assistance with the feature (step 602). In step 602, the visual guidance takes into account the set of actions and includes a context of a graphical user interface present for the user instance of the application displayed on a display system when the user input requesting the assistance with the feature is received during the operation of the user instance of the application.

The process displays the visual guidance of the set of steps performed to use the feature on the display system (step 604). The process terminates thereafter. In this illustrative example, the process is performed dynamically. In other words, the visual guidance is generated in response to receiving the user input or guidance for the feature. This dynamic generation of the visual guidance takes into account the current context of the graphical user interface in which the user instance is displayed. Further, the dynamic generation of the visual guidance also takes into account a current state of the user instance of the application. This process can be performed in real-time.

Figure 7:
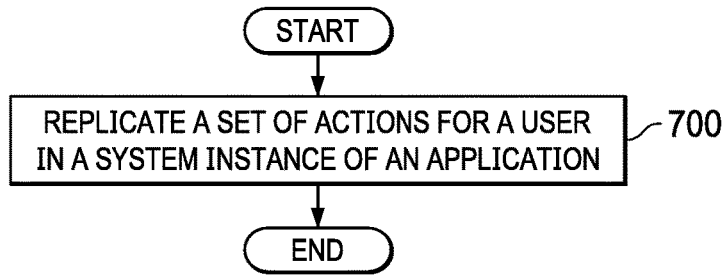
FIG. 7 is a flowchart of a process for capturing a set of actions in accordance with an illustrative embodiment.

With reference next to FIG. 7, a flowchart of a process for capturing a set of actions is depicted in accordance with an illustrative embodiment. The process in FIG. 7 is an example one implementation for step 600 in FIG. 6.

The process replicates a set of actions for a user in a system instance of an application (step 700). The process terminates thereafter. In step 700, user input embodying the actions performed by the user are captured and sent to the system instance. In other words, the user input is sent to the user instance and the system instance of the application. In this manner, the system instance can have the same state as the user instance. The state of the system instance can be used to generate the visual guidance without interfering or changing the state of the user instance.

Figure 8:
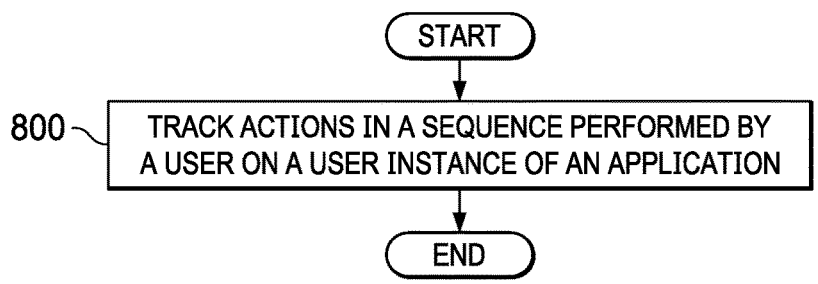
FIG. 8 is a flowchart of a process for capturing a set of actions in accordance with an illustrative embodiment.

In FIG. 8, a flowchart of a process for capturing a set of actions is depicted in accordance with an illustrative embodiment. The process in FIG. 8 is another example of implementation for step 600 in FIG. 6.

The process tracks actions in a sequence performed by a user on a user instance of an application (step 800). The process terminates thereafter. In this illustrative example, the sequence of the actions can be input into an artificial intelligence system that can identify a set of steps needed for the visual guidance. Further, the artificial intelligence system can identify the state of the user instance from the sequence of actions as part of a process for identifying the set of steps needed to use the feature in the user instance of the application. In this case, a complete or fully functional instance of the application is not needed.

Figure 9:
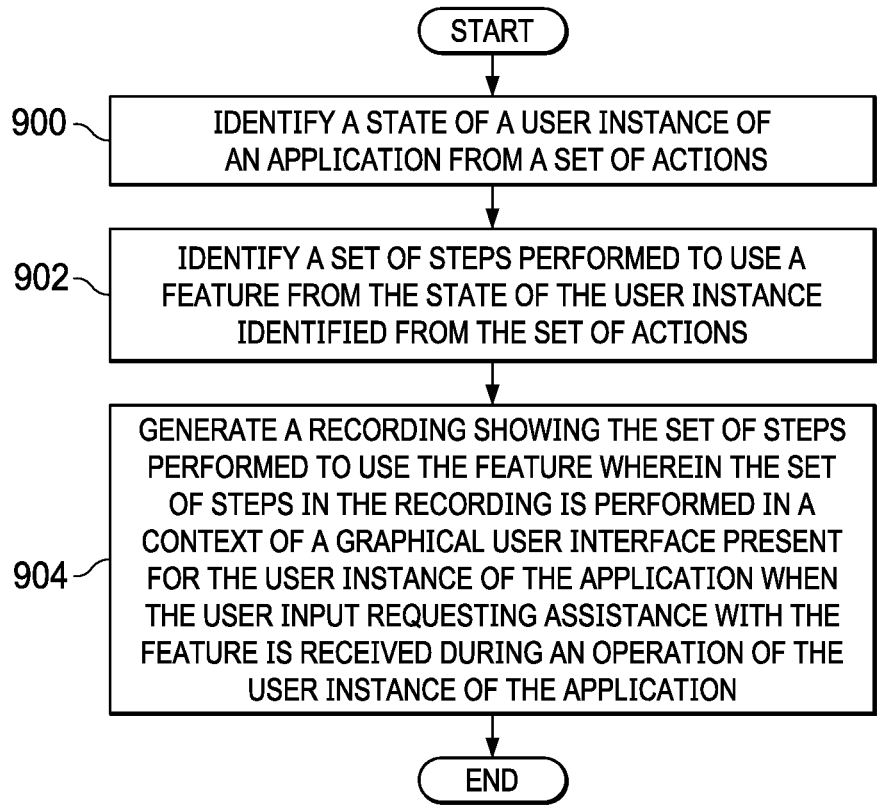
FIG. 9 is a flowchart of a process for generating a visual guidance in accordance with an illustrative embodiment.

With reference now to FIG. 9, a flowchart of a process for generating a visual guidance is depicted in accordance with an illustrative embodiment. The process in FIG. 9 is an example of one implementation for step 602 in FIG. 6.

The process begins by identifying a state of a user instance of an application from a set of actions (step 900). The process identifies the set of steps performed to use a feature from the state of the user instance identified from the set of actions (step 902). The steps needed to use the feature can be identified from a current state. In other words, depending on the particular state of the user instance, different steps may be performed to use a particular feature.

For example, if the user desires to use a save feature in a word processor application and the current state of the user instance of the word processor application is a document that has no restrictions, the step can be to select the disk icon in the tool bar. On the other hand, if the document is in a read-only state, then the steps can be to select the disk icon in the tool bar, select a location, and enter a file name to save the document that is in the read-only state.

The process generates a recording showing the set of steps performed to use the feature wherein the set of steps in the recording is performed in a current context of a graphical user interface present for the user instance of the application when the user input requesting the assistance with the feature is received during an operation of the user instance of the application (step 904). The process terminates thereafter.

Figure 10:
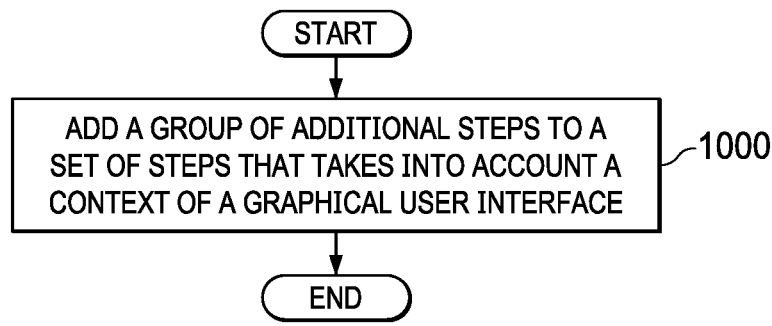
FIG. 10 is a flowchart of a process for generating a visual guidance in accordance with an illustrative embodiment.

Turning to FIG. 10, a flowchart of a process for generating a visual guidance is depicted in accordance with an illustrative embodiment. The process in FIG. 10 includes an additional step that can be performed in the flowchart in FIG. 6 to take into account the context of the of the graphical user interface.

The process begins by adding a group of additional steps to a set of steps that takes into account a context of a graphical user interface (step 1000). The process terminates thereafter. In step 1000, the group of additional steps is one or more additional steps that can be added as needed to take into account the context of the graphical user interface.

For example, in step 1000, one or more steps may be included to ensure that graphical controls or other graphical elements that were involved in the steps performed to use the feature can be seen in the graphical user interface. If the current context of the graphical user interface results in graphical elements that are involved in the steps to use the feature are hidden by other graphical elements, steps can be added to move or remove the graphical elements from the graphical user interface such that those features can be seen. For example, if a window hides a graphical control that is manipulated in a step to use a feature, that window can be moved or closed to ensure that that graphical control can be seen in the visual guidance.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 11:
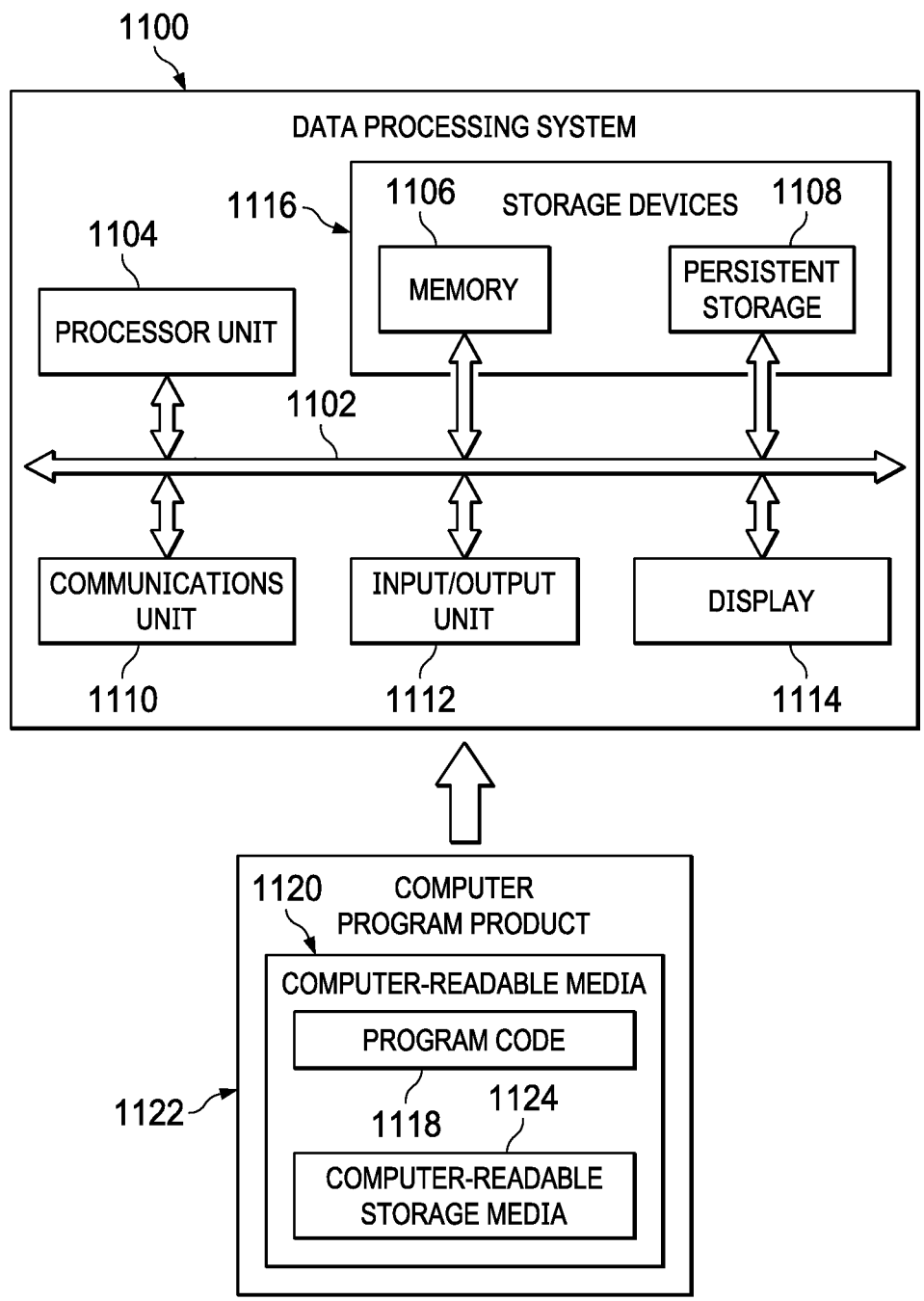
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement server computer 104, server computer 106, client devices 110, in FIG. 1. Data processing system 1100 can also be used to implement computer system 214 in FIG. 2. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1104 can may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are program instructions and are also referred are referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

Computer-readable storage media 1124 is a physical or tangible storage device used to store program code 1118 rather than a medium that propagates or transmits program code 1118. Computer-readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1118 can be transferred to data processing system 1100 using a computer-readable signal media. The computer-readable signal media are signals and can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program code 1118 can be located in computer-readable media 1120 in the form of a single storage device or system. In another example, program code 1118 can be located in computer-readable media 1120 that is distributed in multiple data processing systems. In other words, some instructions in program code 1118 can be located in one data processing system while other instructions in program code 1118 can be located in one data processing system. For example, a portion of program code 1118 can be located in computer-readable media 1120 in a server computer while another portion of program code 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, may be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Thus, the illustrative embodiments of the present invention provide a computer-implemented method, computer system, and computer program product for real-time visual guidance. A set of actions for a user instance of an application is captured during an operation of the user instance of the application by a user. A visual guidance of a set of steps performed to use a feature in the user instance of the application is generated in response to a user input requesting assistance with the feature. The visual guidance takes into account the set of actions and includes a current context of a graphical user interface present for the user instance of the application displayed on a display system when the user input requesting the assistance with the feature is received during the operation of the user instance of the application. The visual guidance of the set of steps performed to use the feature is displayed on the display system.

The illustrative examples can be used to provide assistance to a user and teach the user how to use a feature. Further, the different illustrative examples can also be used as a teaching tool. For example, the different illustrative examples can provide a visual guidance that steps the user through one or more features to teach the user how to generally use an application or how to use the application to perform a task. The visual guidance in these illustrative examples can make it easier for users to understand and learn since the visual guidance takes into account the current context of the graphical user interface. In one illustrative example, the feature manager can be used to teach the user how to form certain drawing tasks using features in a drawing program. For example, a feature manager can generate user guidance on how to fill a closed shape. In the illustrative example, the visual guidance can show the steps needed to use a fill feature based on the closed shape already drawn by the user in the user instance of the application.

As a result, the illustrative examples can provide visual guidance in the form of a recording having motion in which the recording can be a video, an animated GIF, or some other similar construct that includes motion to demonstrate steps performed to use a feature. In the illustrative examples, the visual guidance is dynamically generated based on the current state of the user instance and the current context of the graphical user interface present when the user makes a request for assistance to use a feature. As a result, the visual guidance can have a "look and feel" that is from the same point in time of usage of a user instance of an application by a user in a graphical user interface. As a result, the visual guidance is a real-time context preserving visual guidance. This type of guidance can enable users to more easily and quickly learn how to use features in an application.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for real-time visual guidance, the method comprising:
capturing, by a computer system, a set of actions for a user instance of an application during an operation of the user instance of the application by a user;
generating, by the computer system in real-time, a visual guidance of a set of steps performed to use a feature in the user instance of the application in response to a user input requesting assistance with the feature, wherein the visual guidance generated in real-time by the computer system takes into account the set of actions and includes a context of a graphical user interface present for the user instance of the application displayed on a display system when the user input requesting the assistance with the feature is received during the operation of the user instance of the application; and
displaying, by the computer system, the visual guidance of the set of steps performed to use the feature on the display system, wherein generating, by the computer system, the visual guidance of the set of steps performed to use the feature in the user instance of the application in response to the user input requesting the assistance with the feature, comprises:
identifying, by the computer system, a current state of the user instance of the application from the set of actions;
identifying, by the computer system, the set of steps performed to use the feature from the current state of the user instance identified from the set of actions; and
generating, by the computer system in real-time, a recording showing the set of steps performed to use the feature, wherein the set of steps in the recording are performed in the context of the graphical user interface present for the user instance of the application when the user input requesting the assistance with the feature is received during the operation of the user instance of the application such that the recording includes at least one same window that is currently present in the graphical user interface for the user instance of the application.

2. The method of claim 1, wherein generating, by the computer system, the visual guidance of the set of steps performed to use the feature in the user instance of the application in response to the user input requesting the assistance with the feature further comprises:
adding a group of additional steps to the set of steps that take into account the context of the graphical user interface.

3. The method of claim 1, wherein capturing, by the computer system, the set of actions for the user instance of the application during the operation of the user instance of the application by the user comprises:
replicating, by the computer system, the set of actions for the user in a system instance of the application such that the system instance of the application has a same state as the current state of the user instance of the application, wherein the visual guidance is generated using the system instance of the application.

4. The method of claim 1, wherein capturing, by the computer system, the set of actions for the user instance of the application during the operation of the user instance of the application by the user comprises:
tracking the set of actions, by the computer system, in a sequence performed by the user on the user instance of the application.

5. The method of claim 1, wherein displaying, by the computer system, the visual guidance of the set of steps performed to use the feature on the display system comprises:
displaying, by the computer system, the visual guidance using one of (i) a split screen in which a first part of the split screen displays the user instance and a second part of the split screen displays the visual guidance and (ii) a display of the visual guidance in the graphical user interface in place of the user instance.

6. The method of claim 1, wherein the visual guidance comprises at least one of a video or an animated GIF.

7. The method of claim 1, wherein the context of a graphical user interface present for the user instance of the application displayed on the display system when the user input requesting the assistance with the feature is received during the operation of the user instance of the application comprises at least one of screen space available for the user instance, a resolution for the user instance, a foreground location of a set of other applications overlaying the user instance, a background location of a number of applications overlayed by the user instance, a number of non-active tabs visible in an application, and a look and feel of the graphical user interface on which the user instance is located.

8. A feature guidance system comprising:
a computer system that captures a set of actions for a user instance of an application during an operation of the user instance of the application by a user; generates in real-time a visual guidance of a set of steps performed to use a feature in the user instance of the application in response to a user input requesting assistance with the feature, wherein the visual guidance generated in real-time by the computer system takes into account the set of actions and includes a context of a graphical user interface present for the user instance of the application displayed on a display system when the user input requesting the assistance with the feature is received during the operation of the user instance of the application; and displays the visual guidance of the set of steps performed to use the feature on the display system, wherein in generating in real-time the visual guidance of the set of steps performed to use the feature in the user instance of the application in response to the user input requesting the assistance with the feature, the computer system identifies a current state of the user instance of the application from the set if actions, identifies the set of steps performed to use the feature from a current state of the user instance identified from the set of actions and generates in real-time a recording showing the set of steps performed to use the feature, wherein the set of steps in the recording are performed in the context of the graphical user interface present for the user instance of the application when the user input requesting the assistance with the feature is received during the operation of the user instance of the application such that the recording includes at least one same window that is currently present in the graphical user interface for the user instance of the application.

9. The feature guidance system of claim 8, wherein in generating the visual guidance of the set of steps performed to use the feature in the user instance of the application in response to the user input requesting the assistance with the feature, the computer system adds a group of additional steps to the set of steps that take into account the context of the graphical user interface.

10. The feature guidance system of claim 8, wherein in capturing the set of actions for the user instance of the application during the operation of the user instance of the application by the user, the computer system replicates the set of actions for the user in a system instance of the application such that the system instance of the application has a same state as the current state of the user instance of the application, wherein the visual guidance is generated using the system instance of the application.

11. The feature guidance system of claim 8, wherein in capturing the set of actions for the user instance of the application during the operation of the user instance of the application by the user, the computer system tracks the set of actions in a sequence performed by the user on the user instance of the application.

12. The feature guidance system of claim 8, in displaying the visual guidance of the set of steps performed to use the feature on the display system, the computer system displays the visual guidance using one of (i) a split screen in which a first part of the split screen displays the user instance and a second part of the split screen displays the visual guidance and (ii) a display of the visual guidance in the graphical user interface in place of the user instance.

13. The feature guidance system of claim 8, wherein the visual guidance comprises at least one of a video, an animated GIF, an audio instruction, or a caption.

14. The feature guidance system of claim 8, wherein the context of a graphical user interface present for the user instance of the application displayed on the display system when the user input requesting the assistance with the feature is received during the operation of the user instance of the application comprises at least one of screen space available for the user instance, a resolution for the user instance, a foreground location of a set of other applications overlaying the user instance, a background location of a number of applications overlayed by the user instance, non-active tabs visible in an application, and a look and feel of the graphical user interface on which the user instance is located.

15. The feature guidance system of claim 8, wherein the set of actions comprises the user input and output from the user instance of the application.

16. A computer program product for real-time visual guidance, the computer program product comprising:
a computer-readable storage media;
first program code, stored on the computer-readable storage media, executable by a computer system to capture a set of actions for a user instance of an application during an operation of the user instance of the application by a user;
second program code, stored on the computer-readable storage media, executable by the computer system to generate in real-time a visual guidance of a set of steps performed to use a feature in the user instance of the application in response to a user input requesting assistance with the feature, wherein the visual guidance generated in real-time takes into account the set of actions and includes a context of a graphical user interface present for the user instance of the application displayed on a display system when the user input requesting the assistance with the feature is received during the operation of the user instance of the application; and
third program code, stored on the computer-readable storage media, executable by the computer system to display the visual guidance of the set of steps performed to use the feature on a display system, wherein the second program code comprises:
program code, stored on the computer-readable storage media, executable by the computer system to identify a current state of the user instance of the application from the set of actions;
program code, stored on the computer-readable storage media, executable by the computer system to identify the set of steps performed to use the feature from the current state of the user instance identified from the set of actions; and
program code, stored on the computer-readable storage media, executable by the computer system to generate in real-time a recording showing the set of steps performed to use the feature wherein the set of steps in the recording are performed in the context of the graphical user interface present for the user instance of the application when the user input requesting the assistance with the feature is received during the operation of the user instance of the application such that the recording includes at least one same window that is currently present in the graphical user interface for the user instance of the application.

17. The computer program product of claim 16, wherein the second program code further comprises:
program code, stored on the computer-readable storage media, executable by the computer system to add a group of additional steps to the set of steps that take into account the context of the graphical user interface.

* * * * *